United States Patent [19]
Dickey, Jr.

[11] Patent Number: 5,813,360
[45] Date of Patent: *Sep. 29, 1998

[54] LOCKING VEHICLE COVER

[76] Inventor: Steven R. Dickey, Jr., 9350 Russell St., Overland Park, Kans. 66212

[21] Appl. No.: 814,632

[22] Filed: Mar. 10, 1997

Related U.S. Application Data

[60] Provisional application No. 60/013,454 Mar. 15, 1996.

[51] Int. Cl.⁶ ..................................................... B63B 17/00
[52] U.S. Cl. ............................................ 114/361; 150/166
[58] Field of Search ............................. 114/361; 150/154, 150/166, 167; 296/136

[56] References Cited

U.S. PATENT DOCUMENTS

| | | |
|---|---|---|
| 2,764,765 | 10/1956 | Woodruff, Sr. . |
| 3,192,542 | 7/1965 | Mills, II . |
| 3,955,228 | 5/1976 | Gaschenko et al. . |
| 4,222,032 | 9/1980 | Speer ........................................ 296/136 |
| 4,247,509 | 1/1981 | Talbot . |
| 4,684,165 | 8/1987 | Becker . |
| 4,930,832 | 6/1990 | Shelton . |
| 4,938,522 | 7/1990 | Herron et al. ............................ 150/166 |
| 5,058,946 | 10/1991 | Faber . |
| 5,104,726 | 4/1992 | Ross . |
| 5,124,195 | 6/1992 | Harpell et al. . |
| 5,180,880 | 1/1993 | Zufle . |
| 5,224,363 | 7/1993 | Sutton . |
| 5,497,819 | 3/1996 | Chiang ..................................... 150/166 |

*Primary Examiner*—Sherman Basinger
*Attorney, Agent, or Firm*—Hovey, Williams, Timmons & Collins

[57] ABSTRACT

A vehicle cover includes a sheet of flexible material for covering and protecting at least the upper portion of the vehicle, a securing band coupled with the sheet adjacent the edge thereof, and a preferred ratchet for releasably tightening the band about the periphery of the vehicle below a portion of the vehicle presenting a greater periphery. The band is sufficiently tightened to prevent slipping over the greater periphery and can be locked in the tightened position in order to prevent unauthorized intrusion into the vehicle.

21 Claims, 2 Drawing Sheets

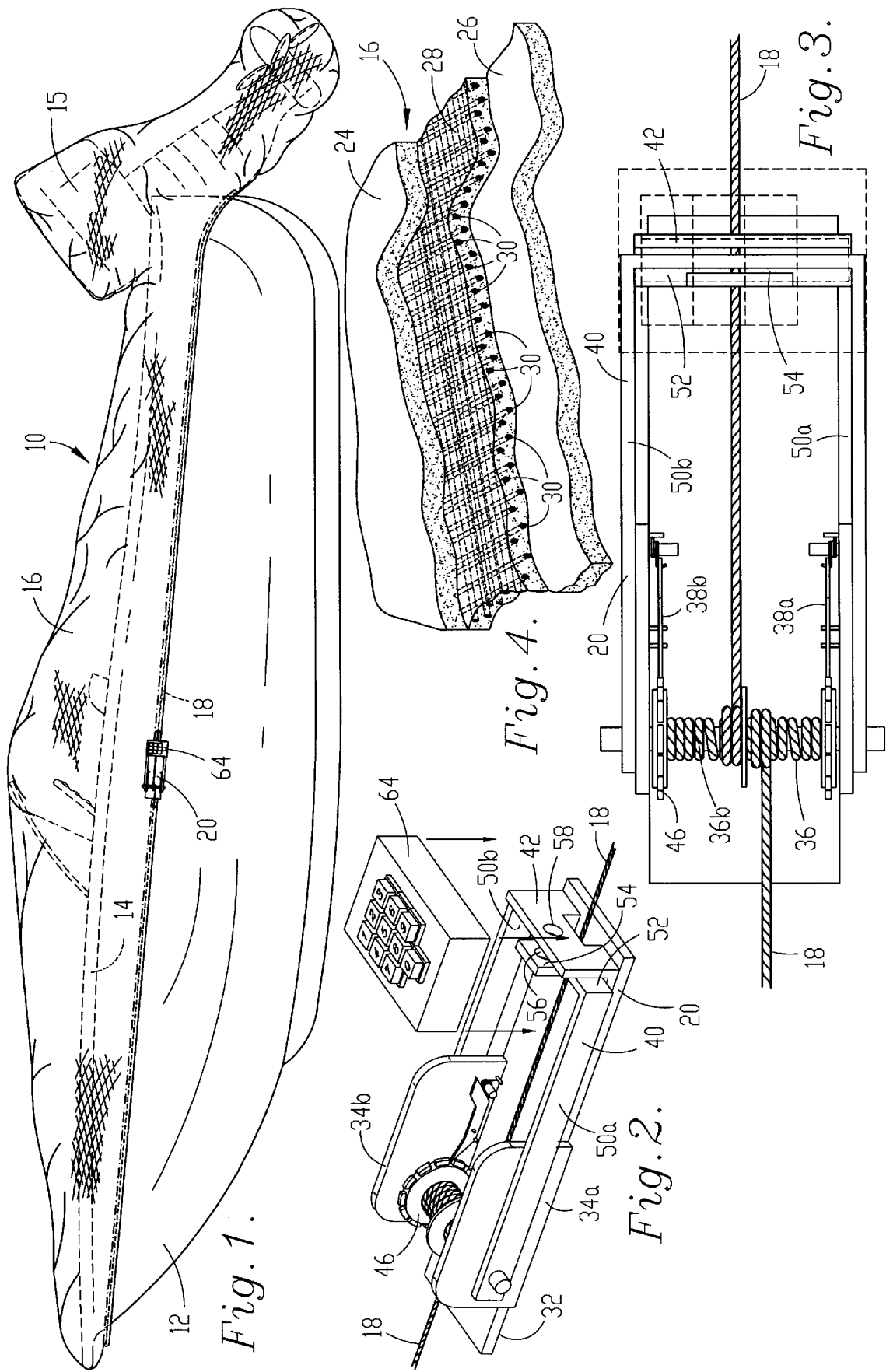

LOCKING VEHICLE COVER

RELATED APPLICATIONS

This application claims priority of provisional patent application Ser. No. 60/013,454, filed Mar. 15, 1996.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of vehicle covers including boat covers. In particular, the invention is concerned with a vehicle cover including a sheet of flexible material, a securing band coupled adjacent the periphery of the sheet, and a mechanism for tightening the band sufficiently to prevent slipping of the band and thereby the cover from the vehicle.

2. Description of the Prior Art

In the prior art, vehicle covers such as boat covers include a flexible sheet and an elastic band coupled about the periphery of the sheet. When installed on a boat, for example, the elastic band is slipped over the boat and released below the level of the boat rail, which usually represents that portion of the boat presenting the greatest periphery.

These prior art vehicle covers, however, do not provide any substantial degree of security. That is, such covers can be removed easily subjecting the boat to vandalism and theft when the boat is unattended.

SUMMARY OF THE INVENTION

The present invention solves the prior problems discussed and provides a distinct advance in the state of the art. In particular, the boat cover hereof provides an enhanced level of security against unauthorized vehicle entry.

The preferred boat cover includes a sheet of flexible material, a securing band coupled with the sheet adjacent the edge thereof, and a shifting mechanism operable for shifting the band between a tightened condition and a relaxed condition. In the tightened condition, the band tightly encompasses the periphery of the vehicle below a location of greater periphery. The shifting mechanism can be locked in the tightened condition in order to prevent the band from being loosened and the cover from being removed from the vehicle. Other preferred aspects of the present invention are discussed further herein.

BRIEF DESCRIPTION OF THE DRAWINGS

FIG. 1 is a side elevational view showing the preferred vehicle cover in use on a boat;

FIG. 2 is a perspective view of the preferred ratchet mechanism of the cover of FIG. 1 with the electronic keypad shown spaced from the mechanism for clarity of illustration;

FIG. 3 is a plan view of the ratchet mechanism of FIG. 2;

FIG. 4 is a partial perspective view of the sheet of the cover of FIG. 1 showing sheet layers cascaded for clarity of illustration.

DETAILED DESCRIPTION OF THE PREFERRED EMBODIMENT

Figure 5:
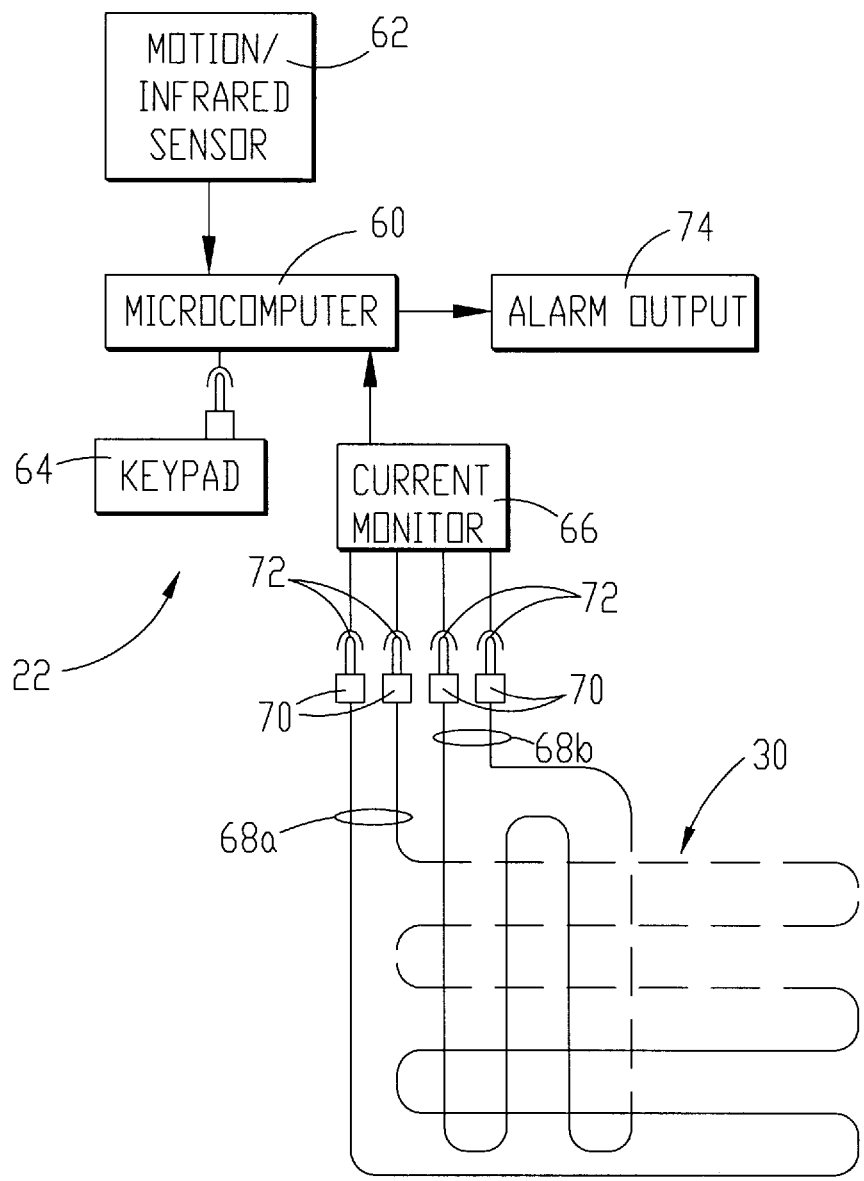
FIG. 5 is an electrical block diagram of the alarm components of the cover of FIG. 1.

FIG. 1 illustrates preferred cover 10 in use on boat 12 as an example of vehicle being covered and protected by cover 10. It will be appreciated that cover 10 finds utility in connection with many other types of vehicles such as jet skis, automobiles, motorcycles, helicopters and the like.

As illustrated, boat 12 includes rail 14 (shown in dashed lines), which represents that portion of boat 12 presenting the greatest periphery. FIG. 1 also illustrates outboard motor 16 shown in dashed lines and encompassed by cover 10.

Cover 10 includes sheet 16, securing band 18, ratchet mechanism 20, and alarm system 22 (FIG. 5). Referring to FIG. 4, flexible sheet 16 includes exterior layer 24, interior layer 26, and intermediate layer 28 therebetween. Layers 24 and 26 are preferably composed of high strength material such as KEVLAR brand synthetic resin material or the equivalent. Such materials are preferred to enhance the physical strength of cover 10 by presenting high resistance to cutting, tearing and abrasion. Intermediate layer 28 is preferably composed of polyester with security wires 30 embedded therein. In the alternative, layer 28 could be composed of two thin layers of polyester with security wires 30 sandwiched and heat bonded between the layers. Wires 30 are preferably composed of stainless steel and arranged as a mesh in order to enhance the structural strength and cut resistance of sheet 16 and also to provide an electrical path for the security system described below.

While the layered configuration is preferred, sheet 16 could be composed of a single layer for economy of manufacture. In addition, other materials could also be used such as nylon, cotton, canvas, dacron, various blends and the like.

Securing band 18 is coupled with sheet 16 adjacent the circumscribing edge thereof, preferably within a loop formed by folding over the edge of sheet 16. Band 18 is preferably composed of stainless steel cable covered with vinyl in order to inhibit abrasion of sheet 16. Stainless steel is also preferred for structural strength. In the alternative, band 18 could be composed of nylon rope, KEVLAR synthetic resin material, or other materials providing strength and minimal stretching. Band 18 is preferably configured with a length sufficient to slip over rail 14 during installation and removal. Respective ends of band 18 are connected to ratchet mechanism 20.

Ratchet mechanism 20 is a conventional ratchet and includes base 32, sidewalls 34a and 34b, ratchet cylinders 36a and 36b, pawls 38a and 38b, handle 40, and front wall 42. Base 32 could be attached to the hull of boat 12 in the position illustrated in FIG. 1, or can remain detached depending upon user convenience and circumstances.

Sidewalls 34a,b are spaced and attached to both sides of base 32 and support ratchet pin 44 therebetween with ratchet cylinders 36a,b axially receiving pin 44 as illustrated in FIG. 2. Each cylinder 36a,b includes ratchet cogs 46 about the periphery respectively adjacent sidewalls 34a,b. Respective pawls 38a,b are biased to engage cogs 46 of cylinders 36a,b.

Handle 40 presents a U-shaped configuration with respective ends of legs 50a and 50b coupled with the respective ends of ratchet pin 44 on the outboard sides of sidewalls 34a,b. Intermediate leg 52 spans the ends of legs 50a,b and presents upstanding locking tab 54 having locking hole 56 defined therethrough. Front wall 42 includes locking port 58 configured to be in registration with locking hole 56 for receiving a padlock therethrough. Ratchet mechanism 22 enables the shifting of band 18 between a tightened condition as illustrated in FIG. 1 and a relaxed condition in which band 18 may be slipped over boat rail 14.

Alarm system 22 is preferably conventional nature of the type commonly used for homes and automobiles. The preferred embodiment includes the capability for motion detection and infrared detection. In general, alarm system 22 includes microcomputer 60, motion/infrared sensor 62, keypad 64, and current monitor 66 connected to security wires 30. Components 60–66 are located within boat 12. The vehicle battery provides the power to operate system 22.

In preferred forms, wires 30 are configured to present a plurality of current loops illustrated in FIG. 5 as loops 68a and 68b. These are analogous to the electrically supervised alarm detection loops used on windows for residential home protection in order to detect unauthorized entry. Each loop terminates with a pair of plugs 70 and plug into sockets 72 located in the hull of the boat. Current monitor 66 provides electrical supervision of loops 68a,b to detect current interruption, as would occur if sheet 16 and thereby wires 30 were cut during an entry attempt into boat 12. In preferred forms, current monitor 66 also monitors for a sudden, predefined increase or decrease in current flow through loops 68a,b in order to detect an attempt to bypass or short circuit loops 68a,b. Removal of any of plugs 70 from sockets 72 would activate current monitor 66.

In order to cover and secure boat 12 using cover 10, band 18 is initially in the relaxed condition. Band 18 along with sheet 16 is slipped over boat rail 12 until band 18 is below the level of rail 14 as illustrated in FIG. 1. This location presents a periphery around boat 12 which is less that the periphery about rail 14.

The user then grasps handle 40 and shifts it back and forth with the ratchet in the tightening mode. This motion is continued until band 18 is secured tightly about boat 12. That is, band 18 is tightened sufficiently to prevent slipping over rail 14 which represents the tightened condition. Handle 40 is then placed in the position shown in FIG. 2 and a padlock slipped through locking hole 56 and locking port 58. This secures band 18 in the tightened position. Plugs 70 of wires 30 are then inserted into sockets 70 for connection to current monitor 66. The wires from keypad 64 are then plugged into externally accessible sockets for connection to microcomputer 60. Next, keypad 64 is slipped over the end of ratchet mechanism 20 using internal spring clips or the like. The attachable nature of keypad 64 allows it to be stored separately. In the alternative, keypad 64 can be mounted permanently to the hull of boat 12, it being appreciated that keypad 64 can be mounted permanently to the hull of boat 12.

At this point, the user then enters the appropriate codes to activate alarm system 22. Once armed, any attempt at intrusion would activate alarm output 74 from microcomputer 60. Such would occur if wires 30 were cut during an attempt to cut through sheet 16. Similarly, if securing band 18 were cut, or the padlock cut to operate ratchet mechanism 20, plug 70 would become detached from sockets 72, which would also activate alarm output 74. As further security, continued entry into the interior of boat 12 would activate motion/infrared sensor 62. Alarm output 74 can include any of those conventionally available such as audible alarms and the activation of alarm circuit to a remote location using a cellular telephone or the like.

In order to re-enter the boat, the user enters the proper codes into keypad 64 which disarms alarm system 22 and removes any padlock. Ratchet mechanism 20 is then used to loosen securing band 18 to the relaxed condition allowing cover 10 to be removed from boat 12.

Having thus described the preferred embodiment of the present invention, the following is claimed as new and desired to be secured by Letters Patent:

1. A vehicle cover apparatus comprising:

a sheet of flexible material configured for covering and protecting at least the upper portion of a vehicle, said sheet presenting a circumscribing edge, the vehicle presenting a first periphery and a second periphery greater than and above said first periphery;

a securing band coupled with said sheet adjacent said edge; and a tightener including a pair of band-engaging components respectively coupled to individual portions of said band, and a handle operatively coupled to said components and movable about an axis for selectively shifting said band between a tightened condition in which said band would tightly encompass the vehicle at said first periphery, and a relaxed condition in which said band could be slipped over said second periphery, said tightener including means for holding said band in said tightened condition, said tightened condition being sufficient for preventing slipping of said band over said second periphery.

2. The apparatus as set forth in claim 1, said sheet being composed of material selected from the group consisting of KEVLAR, canvas, polyester, cotton, dacron and nylon.

3. The apparatus as set forth in claim 1, said sheet including a plurality of layers.

4. The apparatus as set forth in claim 1, said sheet including a strengthening mesh.

5. The apparatus as set forth in claim 4, said mesh including stainless steel wire.

6. The apparatus as set forth in claim 5, said sheet including a plurality of layers with said mesh therebetween.

7. The apparatus as set forth in claim 1, said securing band being composed of material selected from the group consisting of stainless steel, nylon, and synthetic resin material.

8. The apparatus as set forth in claim 1, said tightened including a ratchet mechanism.

9. The apparatus as set forth in claim 1, said vehicle including a boat.

10. The apparatus as set forth in claim 1 further including alarm means for sensing unauthorized removal of said sheet.

11. The apparatus as set forth in claim 1 further including alarm means for sensing cutting of said sheet.

12. The apparatus as set forth in claim 11, said alarm means including a mesh of electrically supervised wiring included in said sheet.

13. The apparatus as set forth in claim 1 further including alarm means for sensing intrusion within said vehicle.

14. The apparatus as set forth in claim 13, said alarm means including a motion detector.

15. The apparatus as set forth in claim 13, said alarm means including an infrared detector.

16. The apparatus as set forth in claim 1 further including alarm means for sensing an attempt at unauthorized intrusion into said vehicle and means responsive thereto for activating an alarm.

17. The apparatus as set forth in claim 16, said alarm including an audible alarm.

18. The apparatus as set forth in claim 16, said vehicle including an electrical system, said alarm means including means for using said electrical system as a power source.

19. The apparatus as set forth in claim 16, said alarm including a wireless alarm signal transmitted to a remote location.

20. A vehicle cover apparatus comprising:

a sheet of flexible material configured for covering and protecting at least the upper portion of a vehicle, said sheet presenting a circumscribing edge, the vehicle presenting a first periphery and a second periphery greater than and above said first periphery;

a securing band coupled with said sheet adjacent said edge; and shifting means for selectively shifting said band between a tightened condition in which said band would tightly encompass the vehicle at said first periphery, and a relaxed condition in which said band could be slipped over said second periphery, said tightener including means for holding said band in said tightened condition, said tightened condition being sufficient for preventing slipping of said band over said second periphery, said sheet including a strengthening mesh of stainless steel wire.

21. A vehicle cover apparatus comprising:

a sheet of flexible material configured for covering and protecting at least the upper portion of a vehicle, said sheet presenting a circumscribing edge, the vehicle presenting a first periphery and a second periphery greater than and above said first periphery;

a securing band coupled with said sheet adjacent said edge; and shifting means for selectively shifting said band between a tightened condition in which said band would tightly encompass the vehicle at said first periphery, and a relaxed condition in which said band could be slipped over said second periphery, said shifting means including means for holding said band in said tightened condition, said tightened condition being sufficient for preventing slipping of said band over said second periphery, said apparatus further including alarm means for sensing cutting sheet, said alarm means including a mesh of electrically supervised wiring included in said sheet.

* * * * *